J. P. McGEE.
Lamp Burner.
No. 82,334. Patented Sept. 22, 1868.
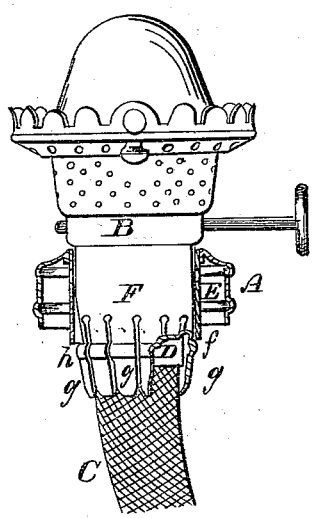
Witnesses.
Inventor.
J. P. McGee
per Munn & Co.
Attorneys.

United States Patent Office.

J. P. McGEE, OF TRENTON, TENNESSEE.

Letters Patent No. 82,334, dated September 22, 1868.

IMPROVEMENT IN LAMP-BURNERS.

*The Schedule referred to in these Letters Patent and making part of the same.*

---

TO ALL WHOM IT MAY CONCERN:

Be it known that I, J. P. McGEE, of Trenton, in the county of Gibson, and State of Tennessee, have invented a new and useful Improvement in Lamps; and I do hereby declare that the following is a full, clear, and exact description thereof, which will enable those skilled in the art to make and use the same, reference being had to the accompanying drawings, forming part of this specification.

This invention relates to the method of fastening the burner to the lamp, whereby the use of a screw is avoided, and the process of attaching and detaching the burner is greatly facilitated; and the invention consists in the construction of the collar on the lamp, and in the manner in which the base of the burner is attached thereto, as will be hereinafter more fully described.

The drawing represents a lamp-burner connected with the lamp-collar according to my invention.

A is the collar on the top of the lamp or oil-reservoir.

B represents the burner.

C is the wick, and

D shows a portion of the wick-tube.

E represents the top of the lamp.

F is the base of the burner.

The collar A is formed with an interior cylinder, $f$, which extends down into the lamp.

As lamps are usually constructed, a screw-thread is cut on the inner side of this cylinder $f$, and the lower part of the burner is made to fit by a screw-thread on its outer side.

My improvement consists in fastening the burner without the screw-thread.

For this purpose, I elongate the base of the burner by extending it below the cylinder $f$, and making slots therein, as seen in the drawing, so that the tongues $g$, which are left, act as springs; but, to make the springs $g$ effective in holding the burner, I form a bead or rib, $h$, around the base, which rib is pressed in when the cylinder is forced down into the lamp, but thrown out by the recoil of the springs when it passes the end of the cylinder, as seen in the drawing.

This makes a secure fastening, and one which allows the burner to be removed from and attached to the lamp with the greatest facility, thus dispensing with the screw entirely, and greatly simplifying and improving the attachment.

I claim as new, and desire to secure by Letters Patent—

The burner B, having its lower end slitted, to form a series of springs, $g$, provided with a head, $h$, which is adapted to press in the springs when the burner is inserted in the cylinder $f$, the expansion of said springs forcing the head under the lower edge of the cylinder, when it has cleared the same, thereby holding the burner in place, as herein shown and described.

J. P. McGEE.

Witnesses:
 JAMES H. FREEMAN,
 W. F. McKEE.